April 17, 1962  J. F. GORDON  3,030,563
SERVOMOTOR CONTROL CIRCUIT
Filed Aug. 24, 1959  2 Sheets-Sheet 1
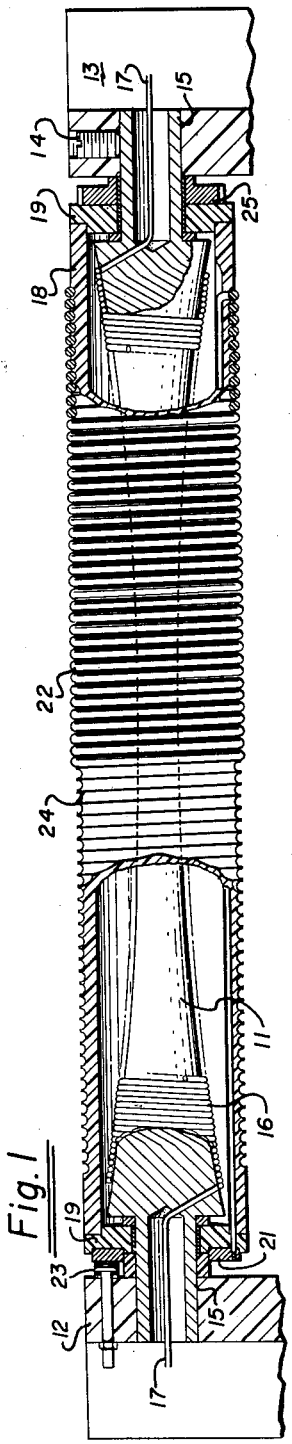
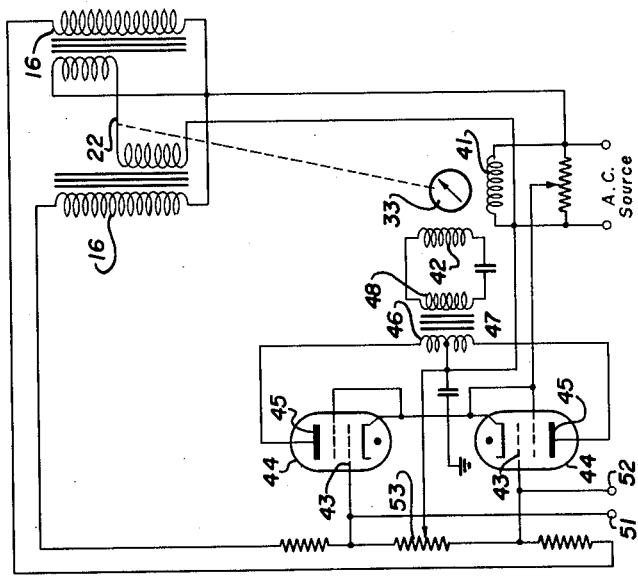
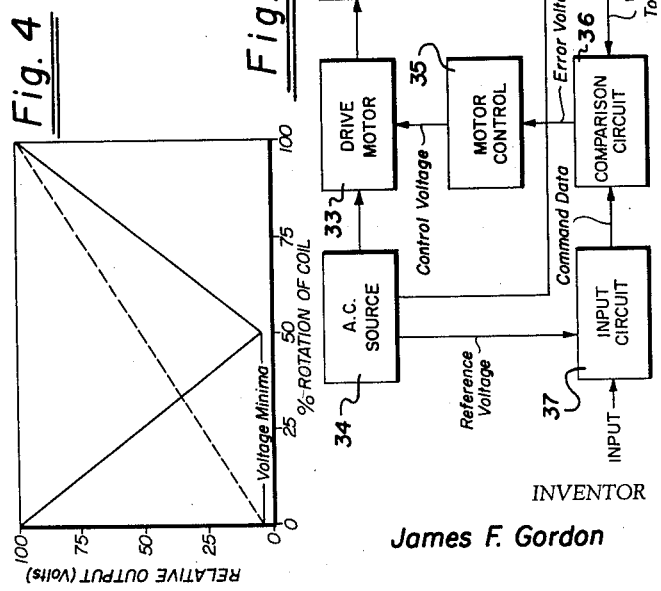
INVENTOR
James F. Gordon
BY
Paul B. Hunter
ATTORNEY

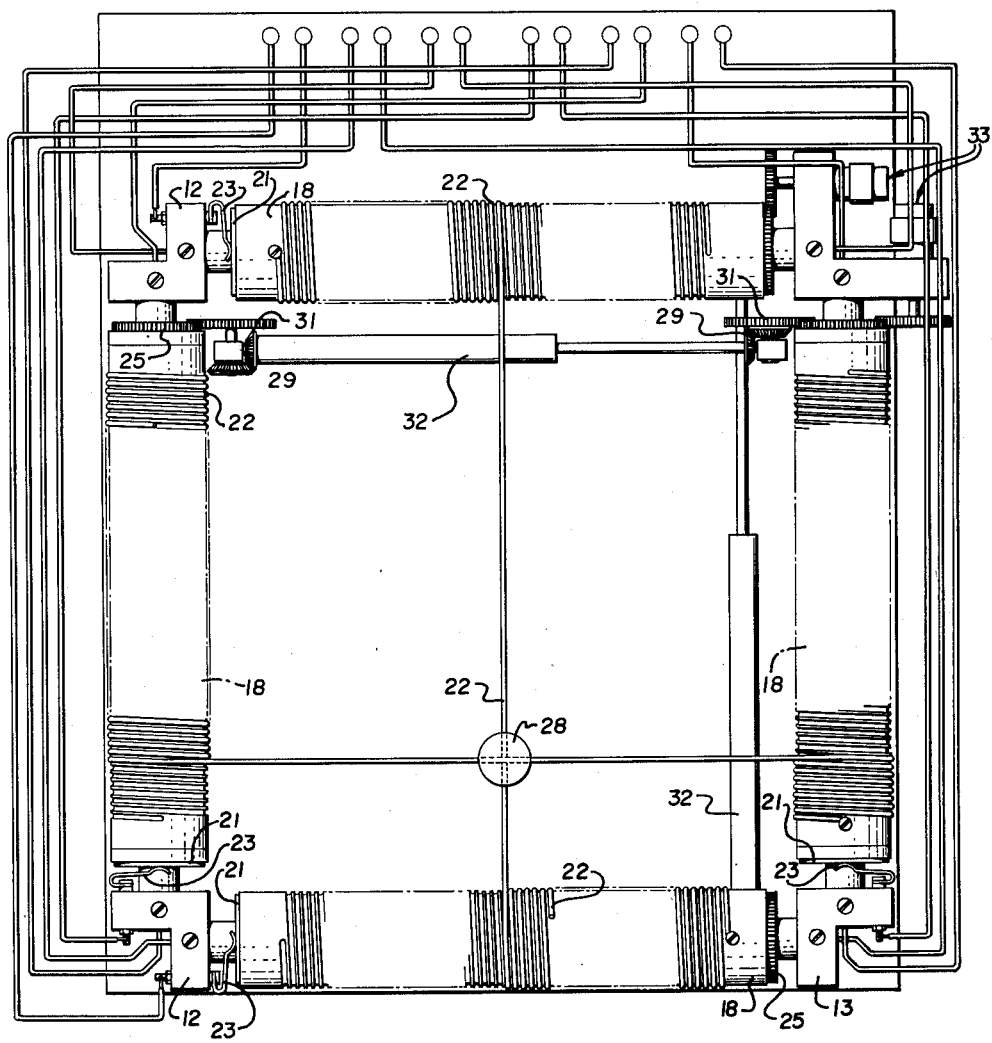
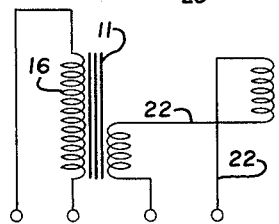
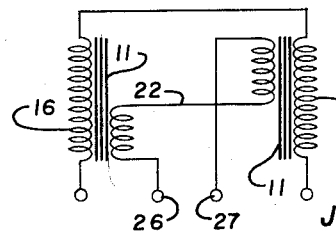

United States Patent Office 3,030,563
Patented Apr. 17, 1962

3,030,563
SERVOMOTOR CONTROL CIRCUIT
James F. Gordon, Santa Ana, Calif., assignor to Pacific Scientific Company, San Francisco, Calif., a corporation of California
Filed Aug. 24, 1959, Ser. No. 835,708
10 Claims. (Cl. 318—28)

This invention relates, in general, to novel control circuit means, and more particularly to a novel control circuit means including a variable transformer device for use, for example, in graphic recorders and the like.

The present invention has for one of its purposes the utilization of a novel variable transformer device for use in producing a variable control signal in accordance with the positioning of an adjustable winding on the transformer device. In one specific embodiment, the variable transformer device is used to produce a control signal which serves as a null balancing indication for a servo mechanism system for controlling the positioning of an indicator means of a type found in graphic recorders such as an X-Y recorder.

Graphic recorders in which variable potentiometers are utilized to supply control signals for balancing-out input signals are well known, the variable position of the potentiometer being determined by a reversible two-phase drive motor. The drive motor which controls the positioning of the balancing potentiometer also controls the positioning of an indicating or marking means on the graphic recorder. In such null balancing, servo mechanism type of recorders, a considerable problem is presented by the use of such potentiometers. To function properly in providing the null-balancing control signals, these potentiometers must be very precisely made, and experience has shown that, although they work reasonably well initially, they give a considerable amount of trouble during use due to wear and the like, thus materially reducing the reliability of such recorders, and requiring considerable maintenance.

It is the object of the present invention to provide a novel control circuit means which utilizes a variable transformer device, such variable transformer device being particularly suitable for use in furnishing the buck-out or null balancing signal for use in null-balancing, servo mechanism type of graphic recorders in place of precision potentiometers.

One feature of the present invention is the provision of a novel control circuit means wherein a control signal is obtained from a variable transformer device including a winding on the transformer which may be varied by removing or adding turns to the winding of the transformer.

Another feature of the present invention is the provision of a novel control circuit means wherein a pair of variable transformer devices are utilized and in which a common wire or cable is provided between the two transformer devices, this common wire or cable providing one of the two windings on each of the transformers and permitting the addition to and subtraction from turns on the said windings of the two variable transformer devices.

Still another feature of the present invention is the provision of a novel control circuit for use in a null balancing, servo mechanism type of recorder wherein the null balancing or buck-out signal is obtained from at least one of the windings of a variable transformer device in which the turns of one of the windings may be variably added to or removed from the transformer, the removable winding serving in addition to position the indicating means, such as a pen marker or the like, of the recorder.

These and other features and advantages of the present invention will be apparent from a perusal of the following specification taken in connection with the accompanying drawings wherein:

FIG. 1 is a plan view partly in cross-section of a novel variable transformer device employed in the present invention;

FIG. 2 is a schematic circuit diagram illustrating the condition when two devices of the type shown in FIG. 1 are used, only one of the devices serving as a variable transformer, the other device having its inner winding and iron core omitted;

FIG. 3 is a schematic circuit diagram similar to FIG. 2 illustrating the condition when two variable transformer devices are connected in a differential arrangement.

FIG. 4 is a graph showing the voltage output of the devices illustrated schematically in FIGS. 2 and 3;

FIG. 5 is a partial view of the mechanical drive portion of a novel dual axis, linear chart graphic recorder utilizing the principles of the present invention;

FIG. 6 is a block diagram of a typical system utilized to control the mechanical drive portion of one of the axes of the dual axis recorder of FIG. 5, and FIG. 7 is a circuit diagram of a typical drive motor circuit adapted for utilization in the system of FIG. 6.

Referring now to FIG. 1, there is illustrated a variable transformer device comprising an iron core 11, narrow at the center and flaring outwardly at both ends, which is fixedly secured in end bearings 12 and 13 by set screws 14 which engage hollow cylindrical extensions 15 on the core ends. A first or primary winding 16 of insulated electrical wire is wound on the core 11, the ends 17 of the winding 16 extending out through the hollow extensions 15 of the core for connection with suitable electrical terminals (not shown).

A hollow cylindrical spool 18, including end caps 19, of insulating material is rotatably mounted on the extensions 15 of the core 11 for axial rotation about the core. The spool 18 is provided with a slip ring 21 on one end cap 19 electrically connected with one end of an insulation coated, electrically conducting cable 22 wound on the outside surface of the spool. Wiper 23 engages the slip ring 21 and thus provides an external terminal for electrical connection with said cable end. The spool 18 is provided with a spiral groove 24 on the outer surface into which the cable 22 fits for proper positioning on the spool. A drive gear 25 is fixedly secured to the other end cap 19 and serves to drive the spool 18 in rotation about the core 11 as described below.

It can be seen from observing FIG. 1 that the cable 22 may function as one winding of a transformer device which also includes winding 16 and iron core 11. For a fixed A.C. potential applied across the ends 17 of winding 16, the output taken from across the ends of cable 22 will be directly proportional to the number of turns of cable 22 reeled on the spool 18. The flared shape of the core 11 serves to linearize the transformer field pattern which otherwise tends to become non-linear due to convergence of the magnetic flux paths at the ends of the core 11. Assume that the portion of the cable 22 taken off spool 18 is wound onto a device similar to the transformer device of FIG. 1 except that it has no internal iron core or second winding. This circuit condition is illustrated by the schematic circuit diagram in FIG. 2. For low frequencies, the reactance of the coil on the second spool becomes very low, and, since the D.C. resistance can be made very low, for most practical purposes one can treat the portion of the cable which is off the transformer spool 18 as being grounded. The output measured across the two ends of cable 22 in FIG. 2 is illustrated by the dotted line in the graph of FIG. 4.

FIG. 3 depicts the condition wherein two variable transformer devices of the type shown in FIG. 1 are utilized, the cable 22 being wound from one onto the other and both having internal cores 11 and windings 16. A number of different electrical connections may be made between the two variable transformers such as series aiding or opposing, or in parallel, or in combinations of these configurations, as is well known to those in the art. FIG. 3 shows the transformer devices connected in a differential arrangement such that, when an A.C. voltage is connected across the terminals 26 and 27 of windings 16, the currents induced in the two secondary coils formed by cable 12 are in opposition. Thus, when an equal number of turns of cable 12 is on each transformer, the output measured across the cable 12 terminals is at a minimum as illustrated by the solid line in the graph of FIG. 4. As turns are removed from one transformer and added to the other, the amplitude of the signal increases linearly from the minimum to the maximum amplitude when one transformer contains all of the turns. The sign of the signal relative to the input depends on which transformer contains the majority of the turns of winding 22.

Referring to FIG. 5, there is shown the cable drive mechanism for an X–Y recorder which utilizes four variable transformer devices of the type shown in FIG. 1 and described above. The upper and lower transformers in the drawing form a part of the X (horizontal) axis recording mechanism while the right and left hand transformers form a part of the Y (vertical) axis mechanism. Elements in all four transformers in this figure similar to elements in FIG. 1 bear the same reference numerals. Only the Y axis recording mechanism will be described in detail since the X axis mechanism is identical.

The two variable transformers in the Y axis mechanism are securely mounted on the recorder base with the cable 22 extending therebetween and having slidably mounted thereon a recorder indicating means 28, such as a light or pen marker or the like, arranged to give an indication on X–Y graph paper or the like (not shown) positioned for cooperation with the indicating means 28. The indicating means 28 is also slidable on the cable 22 extending between the two X axis transformer devices so that it can therefore freely move both vertically and horizontally as driven.

An interlocking gear train including beveled gears 29 and associated gears 31 interconnects the right and left hand spools 18 by means of their end gears 25. A spiral torque spring 32 is included in the interlocking gear train to maintain the gear train under tension such that both of the spools 18 are tensioned in the cable wind-up direction. The cable 22 is thus maintained taut between the two spools 18 at all times.

A reversible drive motor 33 is coupled to the drive gear 25 of the right hand spool 18 and serves to drive this spool and, through the interconnecting gear train, the left hand spool 18, in either of the two rotational directions to move the cable 22 between the spools. The indicating means 28 is carried by the cable 22 and thus serves as an indication of the relative positioning of the cable 22 between the two spools. In other words, as the cable 22 is wound onto the left hand spool 18 and off the right hand spool 18, the indicating means 28 moves vertically downward. With half of the cable 22 on the left hand spool 18, the indicator 28 is at the midway point of the Y axis or zero ordinate; with the cable 22 wound as fully as possible on the left hand spool 18, the indicator 28 is at the lowest or most negative point on the Y axis— the indicator 28 is shown close to its lowest point in the Y axis in FIG. 5. With the cable 22 fully wound on the right hand spool, the indicator 28 is at its highest point or most positive ordinate on the Y axis. As mentioned above, the upper and lower transformer devices operate in the same manner to move the indicator 28 in the X direction between the extremes of the most negative abscissa and the most positive abscissa.

A typical servo mechanism motor drive system for either the X or Y axis drive mechanism of the recorder shown in FIG. 5 is depicted in block diagram form in FIG. 6. The reversible, two-phase induction motor 33 receives its line winding excitation from the A.C. source 34 while its other winding, the control winding, is excited by the balancing or control signal from the motor control circuit 35. As is known in the art, the phase of the current in the control winding relative to the phase of the current in the line winding determines the direction of rotation of the reversible drive motor 33; the amplitude of the control voltage from the motor control circuit 35 determines the extent to which the drive motor will rotate.

The measuring circuit for the servo system is represented by the comparison circuit 36 which is coupled to the input circuit unit 37 and to the secondary windings of the variable transformer devices forming the associated axis drive of the recorder of FIG. 5. For illustration purposes, it will be assumed that the inner windings 16 of the variable transformer devices form the secondary windings while the cable 22 serves as the primary winding to which the A.C. line voltage is connected. The two transformer devices are connected in a differential arrangement such that with equal turns on the secondaries the output is zero.

The signal to be recorded on the recorder is transmitted to the input circuit 37 which receives a reference voltage from the A.C. source 34. The signal output or command signal from this input circuit 37 has an amplitude and sign related to that of the input signal and it is transmitted to the comparison or measuring circuit 36 where the command signal is compared with the signal voltage from the variable transformer device in the cable drive mechanism to produce a resultant difference signal or output error signal. If the signal from the input circuit has an amplitude equal to and a sign the same as the signal from the differentially arranged recorder transformers, the error voltage will be zero. This condition is termed "null balance." When the system is not at null balance, the error signal amplitude is determined by the amount of unbalance and its polarity is determined by the direction of unbalance. When an error signal appears on the input to the motor control 35, a control voltage is produced to drive the motor 33 in the direction necessary to produce a relative change in the number of turns on the secondaries of the two transformer devices to produce thereby an output from the axis drive transformer devices which will tend to reduce the error voltage output of the comparison circuit 36 to zero, the null balance position. When again null balance is reached, the motor will stop and the position of the cable 22 and the indicator 28 will serve as an indication of the input signal voltage.

It can be seen that this variable transformer, null balance recorder system is somewhat similar in operation to the more well-known automatic null-balancing potentiometer principle wherein the voltage output of a variable resistor or potentiometer circuit is utilized for bucking-out or balancing the input signal voltage. The variable transformer of the present instance eliminates the need for such potentiometers.

There is shown in FIG. 7 a schematic diagram of one type of circuitry suitable for operation in the servo mechanism of the recorder described above. The reversible, two-phase induction drive motor 33 is shown, including its line winding 41 and its control winding 42. The line winding 41 is connected to an A.C. supply source as is the cable 22 which forms the primary windings on the two variable transformer devices connected in a differential arrangement. The two secondary windings 16 are connected to the control grids 43 of two thyratron tubes 44. The plates 45 of the two thyratrons are coupled to either side of a center-tapped primary winding 46 of coupling transformer 47. The secondary winding 48 of transformer 47 is connected across the control winding 42 of the drive motor 33.

The parallel thyratron circuit arrangement serves as the comparison circuit which compares the input signal with the output from the differential transformer arrangement and delivers the motor control signal to the motor 33. The input signal is connected to either terminal 51 or 52, or to both if a push-pull type of input signal is utilized, after the circuit has been initially balanced by means of the balancing resistor 53. The thyratron tubes operate in synchronism with the alternating signal applied to them via their control grids from the secondary windings 16, the tubes conducting alternatively on the half cycles. At balance, the plate current of one thyratron equals the plate current of the other, and thus the amplitudes of each half cycle of the alternating voltage supplied to the control winding of the drive motor 33 are equal. If the input to the grid of the thyratron changes, however, the plate current of one thyratron changes relative to the other, dependent on the direction or sign of the signal input change, by an amount dependent upon the amplitude of the change. This results in a change in the amplitude of one half of the cycle of the signal through the winding 46 of transformer 47 relative to the other half of the cycle, and the motor 33 is driven in the proper direction to change the rates of the turns of cable 22 on the two transformer devices such that the relative potentials applied to the two control grids 43 will return the plate currents of the two thyratrons to an equal or balanced condition. At balance, the motor 33 will cease to rotate.

In describing the above X-Y recorder with reference to FIGS. 5, 6 and 7, two variable transformer devices differentially coupled were utilized in the recorder for each axis drive mechanism. It should be emphasized that an axis drive mechanism could be utilized in which only one variable transformer means is employed. In such case, one of the cable take-up devices on the axis drive would not be a variable transformer, that is the internal winding 16 and iron core 11 would be omitted. The output of the transformer arrangement would then vary linearly from a minimum to a maximum, as represented by the dotted line in FIG. 4, and would be suitable for an X-Y recorder device wherein the abscissa and ordinate axes would be at the extreme left and bottom edges of the graph paper or the like. In such an instance, a servomechanism system of the type shown in FIG. 6 is equally applicable while the circuit of FIG. 7 would require a slight modification in that the control information would be applied to one thyratron control grid only while the other of the two thyratrons would be supplied with a fixed reference potential of suitable amplitude and polarity.

Since many changes could be made in the above construction of the novel control circuit of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. A control circuit comprising, in combination, a variable transformer means including a first winding adapted to be coupled to a source of alternating current and a second winding inductively coupled to said first winding for producing an output voltage variable in accordance with the voltage in said first winding, one of said windings being arranged such that turns thereof may be removed therefrom or replaced thereon to vary the output voltage of said transformer means, and a servo mechanism coupled to said transformer means and controlled by the variable output therefrom, said servo mechanism including a drive motor connected to said one winding so as to vary the number of turns thereon in accordance with the signal output of said transformer means.

2. A control circuit as claimed in claim 1 including an indicator means coupled to said one winding and movable in accordance with the number of turns of said winding.

3. A control circuit comprising, in combination, a pair of variable transformer means, each transformer means including a first winding adapted to be coupled to a source of alternating current and a second winding inductively coupled to said first winding for producing an output voltage in variable accordance with the voltage in said first winding, one of said windings being arranged such that turns thereof may be removed therefrom to vary the output voltage of said transformer means, the conductor forming said one winding of each transformer device being common to both of said transformer means, drive means coupling the two transformer means whereby the turns removed from said one winding of one of said transformer means are added to the said one winding of the other transformer means and vice versa, and a servo mechanism including a motor drive connected to said pair of variable transformer means so as to vary the number of turns thereon in accordance with the signal output of said transformer means.

4. A control circuit as claimed in claim 3 including an indicator means coupled to the common conductor forming the said one winding of each transformer device and movable in accordance with the relative positioning of the common conductor between the two said one windings of the pair of variable transformer means.

5. A control circuit comprising, in combination, a variable transformer means including a first winding adapted to be coupled to a source of alternating current and a second winding inductively coupled to said first winding for producing an output voltage in variable accordance with the voltage in said first winding, one of said windings being arranged such that turns thereof may be removed therefrom or replaced thereon to vary the output voltage of said transformer means, a reversible drive motor coupled to said transformer means operable in one direction for winding turns on said one winding and in the other direction for unwinding turns from said one winding, and a control circuit means coupled to said second winding and deriving said output voltage therefrom variable in accordance with the number of turns on said one winding for controlling said drive motor in variable accordance therewith, thereby controlling the number of turns on said winding.

6. A control circuit as claimed in claim 5 including an indicator means coupled to said one winding and movable in accordance with the number of turns on said winding, said indicator thereby serving as a measure of the output voltage of said transformer means.

7. A control circuit comprising, in combination, a variable transformer means including a first winding adapted to be coupled to a source of alternating current and a second winding inductively coupled to said first winding for producing an output voltage in variable accordance with the voltage in said first winding, one of said windings being arranged such that turns thereof may be removed from said winding or replaced thereon to vary the output voltage of said transformer means, a reversible drive motor coupled to said transformer means operable in one direction for winding turns on said one winding and in the other direction for unwinding turns from said one winding, circuit means coupled to said second winding and deriving said output voltage therefrom variable in accordance with the number of turns on said one winding, an input circuit for receiving a command signal, a measuring circuit coupled to said input circuit and to said circuit means for comparing said command signal with the output of said variable transformer to produce an error signal, and means for coupling said measuring circuit to said drive motor for varying the turns on said other winding, thereby changing the voltage output of said variable transformer means in accordance with the error signal obtained from said measuring circuit.

8. A control circuit as claimed in claim 7 including an indicator means coupled to said one winding and movable in accordance with the number of turns on said winding, said indicator thereby serving as a measure of the output voltage of said transformer means.

9. A control circuit comprising, in combination, a pair of variable transformer means, each transformer means including a first winding adapted to be coupled to a source of alternating current and a second winding inductively coupled to said first winding for producing an output voltage in variable accordance with the voltage in said first winding, one of said windings being arranged such that turns thereof may be removed from said winding or replaced thereon to vary the output voltage of said transformer means, the conductor forming said one winding of each transformer device being common to both of said transformer means whereby the turns removed from said one winding of one of said transformer means are added to said one winding of the other transformer means and vice versa, a reversible drive motor coupled to said pair of variable transformer means operable in one direction for winding turns on said one winding of said one transformer means and thereby removing turns from said one winding of the other transformer means, and operable in the other direction for unwinding turns from said one winding of said one transformer means and thereby adding turns to said one winding of the other transformer means, circuit means coupled to said second windings of both of said transformer means for deriving a differential voltage signal from said windings in accordance with the ratio of turns on said associated one windings, an input circuit for receiving a command signal, a measuring circuit coupled to said input circuit and to said circuit means for comparing said command signal with the output of said circuit means to produce an error signal, and means for coupling said measuring circuit to said drive motor for varying the ratio of the turns on said one windings of the pair of transformer means, thereby changing the voltage output of the differentially connected transformer means in accordance with the error signal obtained from said measuring circuit.

10. A control circuit as claimed in claim 9 including an indicator means connected to the common conductor and movable responsive to movement of the conductor between the two variable windings of said pair of transformer means.

References Cited in the file of this patent
UNITED STATES PATENTS

| | | |
|---|---|---|
| 862,361 | Thomson | Aug. 6, 1907 |
| 2,451,757 | MacGeorge | Oct. 19, 1948 |
| 2,615,936 | Glass | Oct. 28, 1952 |
| 2,913,654 | Clark | Nov. 17, 1959 |